United States Patent [19]

Johnson

[11] Patent Number: 4,944,391
[45] Date of Patent: Jul. 31, 1990

[54] CONTAINER AND DISPENSER OF COINS

[76] Inventor: Richard H. Johnson, 409 S. Orchard, Park Forest, Ill. 60466

[21] Appl. No.: 396,202

[22] Filed: Aug. 21, 1989

[51] Int. Cl.[5] .................... A45C 11/28; B65D 43/20
[52] U.S. Cl. .................... 206/0.83; 206/1.5; 206/459; 220/346; 221/91; 232/1 D
[58] Field of Search .................... 206/0.8-0.84, 206/1.5, 534-538, 459; 220/20-22, 345-351; 232/1 D, 43.1, 64; 221/91, 92

[56] References Cited

U.S. PATENT DOCUMENTS

| | | | |
|---|---|---|---|
| 243,925 | 7/1881 | La Bau | 206/535 X |
| 1,089,939 | 3/1914 | Maxwell | 206/0.83 |
| 1,161,909 | 11/1915 | Trovaton | 206/0.83 |
| 1,569,506 | 1/1926 | Lau | 206/443 |
| 1,770,146 | 7/1930 | Silver et al. | 232/1 D |
| 2,026,362 | 12/1935 | Salzman | 232/1 D |
| 2,053,599 | 9/1936 | Brinkerhoff | 220/350 X |
| 2,650,699 | 9/1953 | Donovan | 220/350 X |
| 2,663,457 | 12/1953 | Shaffer | 220/345 X |
| 2,708,026 | 5/1955 | Duell | 220/345 X |
| 3,033,355 | 5/1962 | Van Sickle | 206/539 |
| 3,285,681 | 11/1966 | Niederer | 206/0.83 |
| 3,537,422 | 11/1970 | Moe | 220/345 X |
| 3,817,372 | 6/1974 | Smith | 206/539 |
| 3,949,899 | 4/1976 | Jacobs et al. | 220/346 |
| 3,960,270 | 6/1976 | May | 220/346 X |
| 4,062,445 | 12/1977 | Möe | 206/1.5 |
| 4,381,054 | 4/1983 | Schurman | 221/91 X |
| 4,390,217 | 6/1983 | Wagner | 220/345 X |
| 4,465,191 | 8/1984 | Darbo | 221/91 X |
| 4,615,461 | 10/1986 | Liu | 220/345 X |
| 4,844,279 | 7/1989 | Chalat | 220/22 |

FOREIGN PATENT DOCUMENTS 14806 of 1894 United Kingdom .................... 206/0.83

Primary Examiner—Bryon P. Gehman
Attorney, Agent, or Firm—Ernest Kettelson

[57] ABSTRACT

A container and dispenser of coins for toll booths comprising an enclosed rectangular box preferably made of resilient plastic having a left half and right half, wherein a plurality of pockets in the left half open to the top and extend to a floor at the bottom of the left half, and wherein a plurality of pockets in the right half open to the bottom and extend to a floor at the top of the right half. The pockets are formed by spaced apart walls leaving enough room in each pocket to provide the exact change for a specified series of toll booths. A slidable cover is provided on the top and bottom of the container to initially close all of the pockets. When the cover slides far enough to fully uncover one pocket, a stop member on the underside of the cover drops into a notch of a guide rail which tends to resist further sliding toward the fully open position and provides a distinctive "click" sound indicating to the user that one pocket has been fully uncovered for dispensing the exact amount of coins for a respective toll booth from such position. Each notch is spaced apart a distance needed to fully open the next adjacent pocket but not so far that coins in the second adjacent pocket fall out.

6 Claims, 4 Drawing Sheets

CONTAINER AND DISPENSER OF COINS

BACKGROUND OF THE INVENTION

This invention relates to the field of coin containers, and in particular to coin containers that can be utilized as dispensers thereby providing easy access to coins when driving on highways and bridges where toll booths are encountered.

Prior art coin container designs have been aimed at holding coins in a position whereby a driver can reach and retrieve the amount of coins need for a toll booth. No coin container design has addressed the problem of the drivers view being distracted when retrieving the coins.

The problems with prior art coin containers is that they are designed to hold coins thereby requiring a driver to view the container to remove the required coins or the coin container will dispense coins in a driver's hand but does not provide the exact amount of coins required thereby causing the driver to distract his view to sort out of the required coins.

Examples of prior art devices includes those disclosed in the following United States Patents:

Pat. No. 3,945,491 discloses a holder for coins or other small objects with a pocket or lip section to hold coins and a flattened under section to act as a base which attaches to an area of a car where the coins would be accessible to the driver. One problem with this device is that a driver must view the device and coins to retrieve the required amount to pay a toll. Another problem with this device is that the device does not hold the exact amount of coins required for one toll booth when a series of toll booths are encountered thereby causing the driver to distract his view for a further period of time once his view is focused upon the coin holder.

Pat. No. 3,329,277 discloses a holder for coins and other small objects that mounts on a dashboard in an automobile by utilizing a magnet. A plurality of recesses for coins are positioned on the front and top side of a base that is attached to the dashboard by the magnet. The problems with this device is that a driver must distract his view from the road to retrieve the coins and must spend time retrieving the exact amount of coins required due to the holder failing to group coins in predetermined amounts.

Pat. No. 3,144,987 discloses a coin dispensing tray. This device is utilized with a coin dispensing machine that automatically feeds a predetermined amount of coins into the tray. The object of the tray is to provide easy retrieval of change to a purchaser. Although the tray could be adapted to a dashboard in an automobile, the same aforementioned problems would occur. The drivers view would be distracted to collect the coins and the required amount of coins would have to be determined by the driver thereby further distracting his view.

Pat. No. 2,354,001 discloses a coin holder for making change. Coins are placed in horizontal grooves or pockets in a base and held in place by a wall at each end of the pocket with the walls short enough to expose the upper section of the coins to allow a driver of a bus to grasp the required coins to make change for a customer.

Pat. No. 1,896,976 discloses a coin container of cylindrical design and divided into four individual compartments on which a cover is rotatably mounted with the cover having a discharge opening adapted to be moved into registration with any one of the compartments, while a closure member is rotatably arranged with respect to the remaining compartments to seal said compartment and allow only the one compartment to be emptied. Each compartment would hold coins of the same denomination.

Pat. No. 1,363,828 discloses a coin delivering device. The device has a coin receptacle that receives coins and acts as a funnel with an elliposoidal member that seals an orifice at the bottom of the receptacle with a portion of the ellipsoidal member protruding through the orifice. Coins are removed without regard to denomination by lifting up the ellipsoidal member and allowing coins to fall through the orifice at the bottom of the receptacle. The receptacle is resealed by allowing the ellipsoidal member to fall to the bottom of the receptacle.

Pat. No. 793,416 discloses a change delivery device that is lifted to align an orifice in a side wall of the device with a slot sloping downward in which coins have been placed to allow the coins to slide through the orifice in the side wall and into the hand of the user.

Pat. No. 243,925 discloses a box for holding game counters or chips comprised of a block of wood having a row of cells of equal diameter extending through the upper surface to near the bottom surface of the block with orifices through the bottom surface and axially aligned with the cells. The upper surface of the block has a groove to receive a cover to seal in all chips placed in the cells. When removing the chips in a cell, the cover is slid back a distance to expose the contents of one cell, a finger is then inserted through the orifice in the bottom surface of the cell to force the chips out.

SUMMARY OF THE INVENTION

It is an object of the invention to provide a container and dispenser of coins for toll booths which is a totally enclosed rectangular box having a left half and a right half.

It is an object of the invention to provide a container and dispenser of coins for toll booths having a plurality of pockets in the left half that open to the top and a plurality of pockets in the right half that open to the bottom.

It is an object of the invention to provide a container and dispenser of coins for toll booths having a slidable cover on top to cover pockets when in the left position and slide to the right to uncover the pockets which open to the top surface of the container.

It is an object of the invention to provide a container and dispenser of coins for toll booths having a slidable cover on the bottom to cover pockets when in the right position and slide to the left to uncover the pockets which open to the bottom surface of the container.

It is an object of the invention to provide a container and dispenser of coins for toll booths having a longitudinal extending guide rail with spaced apart notches which extends rearwardly of the slidable covers, secured to the outwardly facing side of a floor portion of the top and bottom surfaces of the container and centrally positioned thereon.

It is an object of the invention to provide a container and dispenser of coins for toll booths having a stop member on the underside of the covers to seat in each spaced apart notch as the cover is slid progressively from the fully closed position towards the fully open position.

It is an object of the invention to provide a container and dispenser of coins for toll booths that has the stop member on the underside of the cover drop into a notch of the guide rail which tends to resist further sliding toward the fully open position and provides a distinctive "click" sound indicating to the user that one pocket has been fully uncovered for dispensing the exact amount of coins required for a toll booth from such position and keeping all the remaining coin containing pockets covered.

It is an object of the invention to provide a container and dispenser of coins for toll booths with pockets large enough to hold the exact amount of coins required for a respective toll booth in a series of toll booths to be encountered along a highway while driving.

DESCRIPTION OF PREFERRED EMBODIMENT

Figure 1:
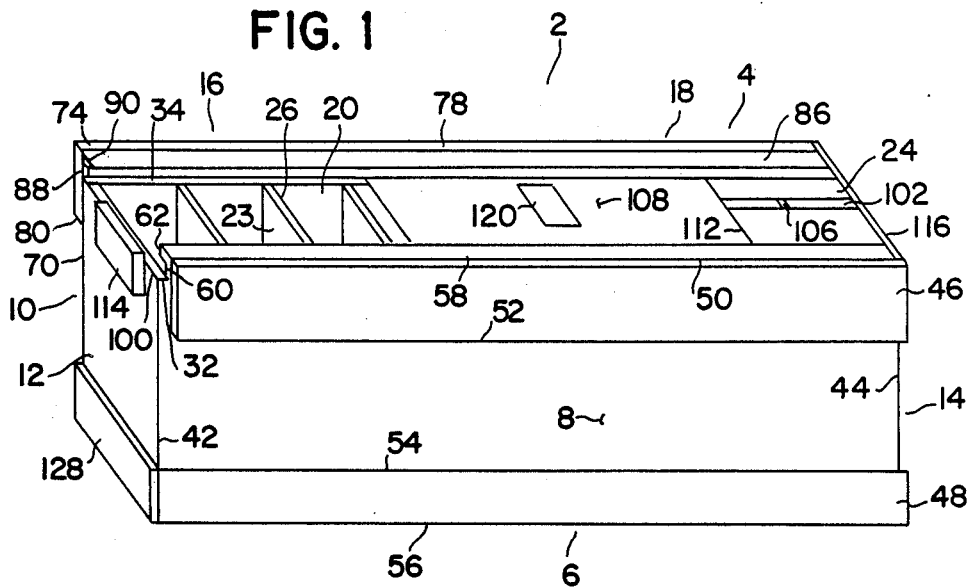
FIG. 1 is a perspective view of a container and dispenser of coins for toll booths in accordance with this invention showing the upper surface with the upper cover partially opened.
Figure 2:
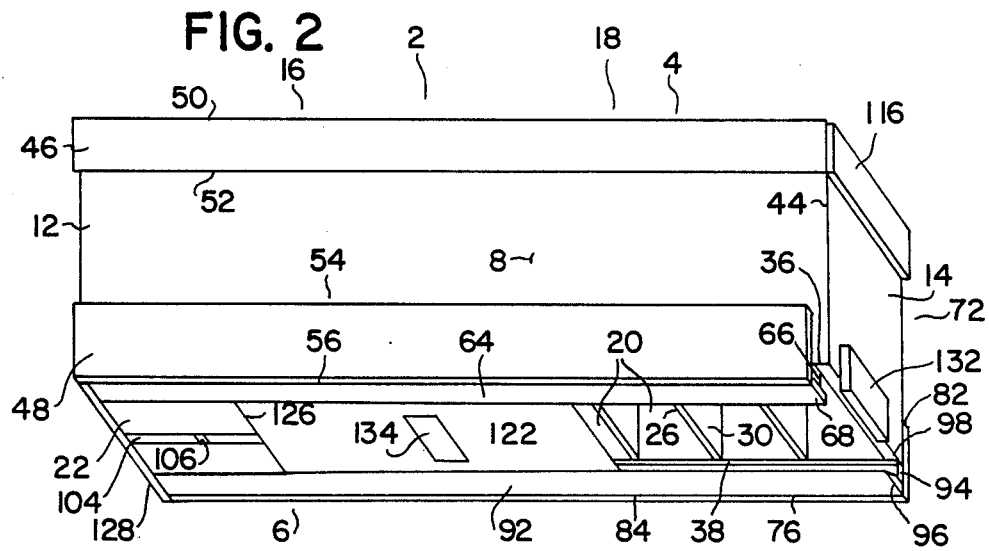
FIG. 2 is a perspective view of a container and dispenser of coins for toll booths in accordance with this invention showing the lower surface with the lower cover partially opened.
Figure 3:
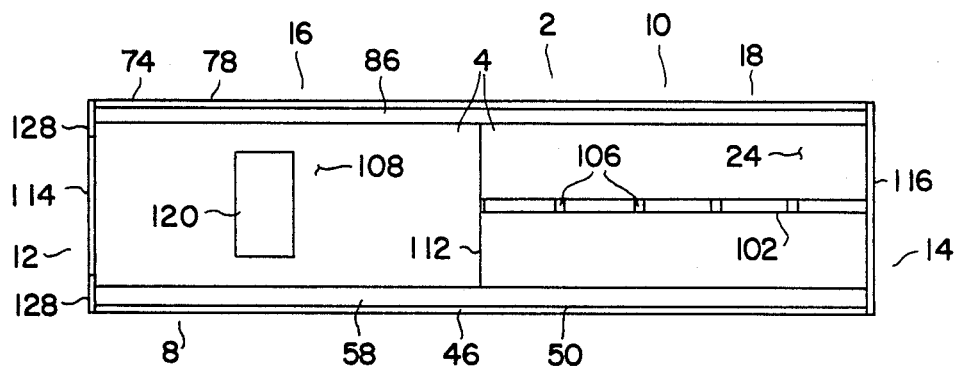
FIG. 3 is a top view of the container shown in FIG. 1 with the cover completely closed.
Figure 4:
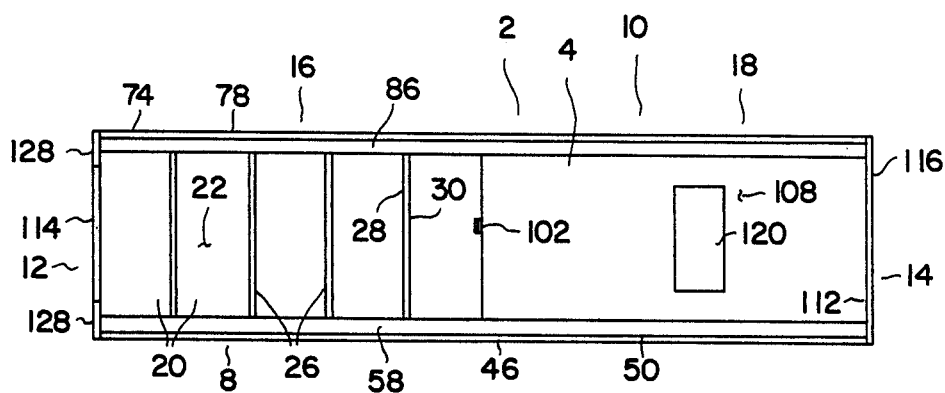
FIG. 4 is a top view of the container shown in FIG. 1 with the cover completely open.
Figure 5:
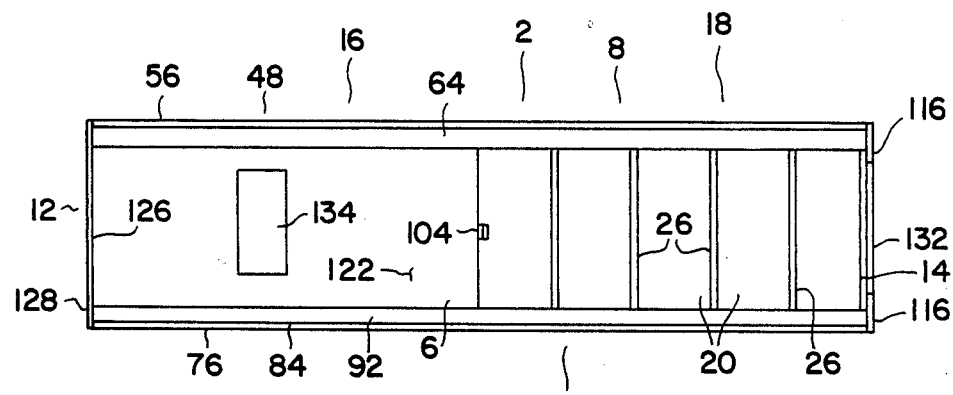
FIG. 5 is a bottom view of the container shown in FIG. 2 with the cover completely open.
Figure 6:
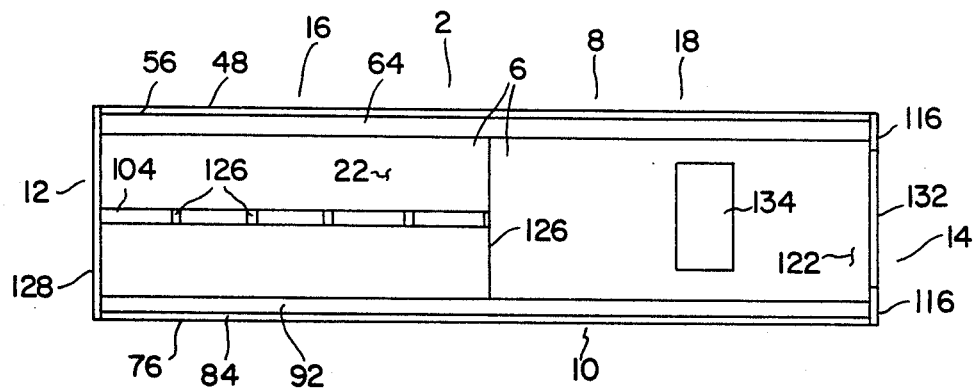
FIG. 6 is a bottom view of the container shown in FIG. 2 with the cover completely closed.
Figure 7:
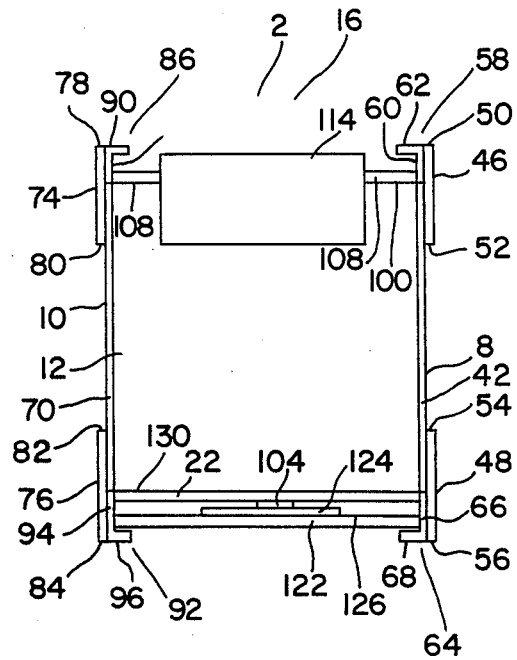
FIG. 7 is an elevation view of one end of the container as shown in FIG. 1 with the first cover seal for the lower cover removed, the upper cover to the far right or open position, and the lower cover to the far left or open position.
Figure 8:
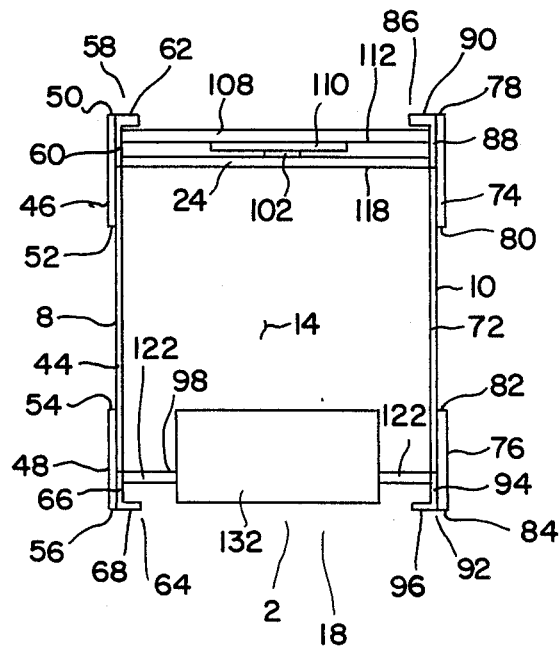
FIG. 8 is an elevation view of the opposite end of the container as shown in FIG. 2 with the second cover seal for the upper cover removed, the upper cover to the far right or open position, and the lower cover to the far left or open position.

A container 2 and dispenser of coins for toll booths in accordance with the present invention includes a totally enclosed rectangular box with an upper surface 4, a lower surface 6, a front wall 8, a rear wall 10, a first side wall 12 and a second side wall 14.

The container 2 is elongated and preferably made of resilient plastic although other materials could be utilized such as metal. The container 2 measures approximately five inches from the first side wall 12 to the second side wall 14, one and one-half inches from the front wall 8 to the rear wall 10 and one and one-half inches from the upper surface 4 to the lower surface 6. The aforementioned dimensions may vary as long as the container's overall size allows the container 2 to be easily manipulated with one hand of the user.

The upper surface 4 of the container 2 includes a left half 16 and a right half 18, wherein a plurality of pockets 20 in the left half 16 open to the upper surface 4 and extend to the inwardly facing side of a floor 22 portion of the lower surface 6. A plurality of pockets 20 in the right half 18 open to the lower surface 6 and extend to the inwardly facing side of a floor 24 portion of the upper surface 4.

The pockets 20 are formed by spaced apart pocket walls 26 leaving enough room in each pocket to provide the exact change for a specified series of toll booths. The walls 26 measure approximately one-sixteenth inch from the first side 28 to the second side 30 and are in planes parallel to the first side wall 12 and second side wall 14 and perpendicular to the front wall 8 and rear wall 10. The walls 26 extend from the inwardly facing side of the front wall 8 to the inwardly facing side of the rear wall 10. The walls 26 in the left half 16 of the container 2 extend from the inwardly facing side of the floor 22 of the lower surface 6 to the upper edge 32 of the front wall 8 and the upper edge 34 of the rear wall 10 thereby forming walls 26 square in cross-section when viewed from the first side wall 12 or second side wall 14. The walls 26 in the right half 18 of the container 2 extend from the inwardly facing side of the floor 24 of the upper surface 4 to the lower edge 36 of the front wall 8 and the lower edge 38 of the rear wall 10 thereby forming walls 26 square in cross-section when viewed from the first side wall 12 or second side wall 14. The walls 26 are held in place by an adhesive, strong enough to support the weight of the coins placed in the container 2.

The front wall 8 of the container 2 measures approximately five inches from a first side edge 42 to a second side edge 44, one and one-half inches from the upper edge 32 to the lower 36 and one-sixteenth inch from the outwardly facing side to the inwardly facing side. An upper cover guide support 46 is attached to the upper portion of the outwardly facing side of the front wall 8. A lower cover guide support 48 is attached to the lower portion of the outwardly facing side of the front wall 8. The upper cover guide support 46 measures approximately one-third of an inch from an upper edge 50 to a lower edge 52, one-sixteenth inch from an inwardly facing side to an outwardly facing side and extends from the first side edge 42 of the front wall 8 to the second side edge 44 of the front wall 8. The upper cover guide support 46 is attached to the front wall 8 such that one-third of the support 46 extends above the upper edge 32 of the front wall 8 with the upper edge 50 of the support 46 parallel to the upper edge 32 of the front wall 8. The remaining portion of the support 46 is glued to the outwardly facing side of the front wall 8.

The lower cover guide support 48 measures approximately one-third of an inch from an upper edge 54 to a lower edge 56, one-sixteenth inch from an inwardly facing side to an outwardly facing side and extends from the first side edge 42 of the front wall 8 to the second side edge of the front wall 8. The lower cover guide support 48 is attached to the front wall 8 such that one-third of the support 48 extends below the lower edge 36 of the front wall 8 with the lower edge 56 of the support 48 parallel to the lower edge 36 of the front wall 8. The remaining portion of the support 48 is glued to the outwardly facing side of the front wall 8.

An upper cover guide 58 is attached to the upper cover guide support 46 of the front wall 8. The upper cover guide 58 includes a guide member 60 and a retaining member 62. Each member 60 and 62 is approximately one-sixteenth inch thick, one-eighth inch in width and extend from the first side edge 42 to the second side edge 44 of the front wall 8 with the members 60 and 62 integrally joined longitudinally such that the members 60 and 62 form a ninety degree angle when viewing the container 2 from the first side wall 12 with the longitudinal axes of both members 60 and 62 running parallel to the front wall 8.

The guide member 60 of the upper cover guide 58 is longitudinally attached to the inwardly facing side of the portion of the upper cover guide support 46 that extends above the upper edge 32 of the front wall 8, thereby positioning the retaining member 62 flush with the upper edge 50 of the upper cover guide support 46 with the retaining member 62 extending inwardly above the pocket walls 26 and perpendicular to the front wall 8.

A lower cover guide 64 is attached to the lower cover guide support 48 of the front wall 8. The lower cover guide 64 includes a guide member 66 and a retaining member 68. Each member 66 and 68 is approximately one-sixteenth inch thick, one-eighth inch in width and extend from the first side edge 42 to the second side edge 44 of the front wall 8 with the members 66 and 68 integrally joined longitudinally such that the members 60 and 62 form a ninety degree angle when viewing the container 2 from the first side wall 12 with the longitudinal axes of both members 66 and 68 running parallel to the front wall 8.

The guide member 66 of the lower cover guide 64 is longitudinally attached to the inwardly facing side of the portion of the lower cover guide support 48 that extends below the lower edge 36 of the front wall 8, thereby positioning the retaining member 68 flush with the lower edge 52 of the lower cover guide support 48 with the retaining member 68 extending inwardly above the pocket walls 26 and perpendicular to the front wall 8.

The rear wall 10 of the container 2 measures approximately five inches from a first side edge 70 to a second side edge 72, one and one-half inches from the upper edge 34 to the lower edge 38 and one-sixteenth inch from the outwardly facing side to the inwardly facing side. An upper cover guide support 74 is attached to the upper portion of the outwardly facing side of the rear wall 10. A lower cover guide support 76 is attached to the lower portion of the outwardly facing side of the rear wall 10. The upper cover guide support 74 measures approximately one-third of an inch from an upper edge 78 to a lower edge 80, one-sixteenth inch from an inwardly facing side to an outwardly facing side and extends from the first side edge 70 of the rear wall 10 to the second side edge 72 of the rear wall 10. The upper cover guide support 74 is attached to the rear wall 10 such that one-third of the support 74 extends above the upper edge 34 of the rear wall 10 with the upper edge 78 of the support 74 parallel to the upper edge 34 of the rear wall 10. The remaining portion of the support 74 is glued to the outwardly facing side of the rear wall 10.

The lower cover guide support 76 measures approximately one-third of an inch from an upper edge 82 to a lower edge 84, one-sixteenth inch from an inwardly facing side to an outwardly facing side and extends from the first side edge 70 of the rear wall 10, to the second side edge of the rear wall 10. The lower cover guide support 76 is attached to the rear wall 10 such that one-third of the support 76 extends below the lower edge 38 of the rear wall 10 with the lower edge 84 of the support 76 parallel to the lower edge 38 of the rear wall 10. The remaining portion of the support 76 is glued to the outwardly facing side of the rear wall 10.

An upper cover guide 86 is attached to the upper cover guide support 74 of the rear wall 10. The upper cover guide 86 includes a guide member 88 and retaining member 90. Each member 88 and 90 is approximately one-sixteenth inch thick, one-eighth inch in width and extend from the first side edges 70 to the second side edge 72 of the rear wall 10 with the member 88 and 90 integrally joined longitudinally such that the members 88 and 90 form a ninety degree angle when viewing the container 2 from the first side wall 12 with the longitudinal axes of both members 88 and 90 running parallel to the rear wall 10.

The guide member 88 of the upper cover guide 86 is longitudinally attached to the inwardly facing side of the portion of the upper cover guide support 74 that extends above the upper edge 34 of the rear wall 10, thereby positioning the retaining member 90 flush with the upper edge 78 of the upper cover guide support 74 with the retaining member 90 extending inwardly above the pocket walls 26 and perpendicular to the rear wall 10. A lower cover guide 92 is attached to the lower cover guide support 76 of the rear wall 10. The lower cover guide 92 includes a guide member 94 and a retaining member 96. Each member 94 and 96 is approximately one-sixteenth inch thick, one-eighth inch in width and extend from the first side edge 70 to the second side edge 72 of the rear wall 10 with the members 94 and 96 integrally joined longitudinally such that the members 94 and 96 form a ninety degree angle when viewing the container 2 from the first side wall 12 with the longitudinal axes of both members 94 and 96 running parallel to the rear wall 10.

The guide member 94 of the lower cover guide 92 is longitudinally attached to the inwardly facing side of the portion of the lower cover guide support 76 that extends below the lower edge 84 of the rear wall 10, thereby positioning the retaining member 96 flush with the lower edge 84 of the lower cover guide support 76 with the retaining member 96 extending inwardly below the pocket walls 26 and perpendicular to the rear wall 10.

The first side wall 12 and second side 14 have the exact dimensions as the pocket walls 26. The first side wall 12 is attached to the inwardly facing side of the front wall 8 and the inwardly facing side of the rear wall 10 such that the outwardly facing side of the first side wall 12 is flush with the first side edge 42 of the front wall 8 and flush with the first side edge 70 of the rear wall 10. The second side wall 14 is attached to the inwardly facing side of the front wall 8 and the inwardly facing side of the rear wall 10 such that the outwardly facing side of the second side wall 14 is flush with the second side edge 44 of the front wall 8 and the second side edge 72 of the rear wall 10.

The floor 22 portion of the lower surface 6 is approximately half the longitudinal dimension of the front wall 8 and rear wall 10 or two and one-half inches. The floor portion of the lower surface 6 is glued between the inwardly facing side of the front wall 8, the inwardly facing side of the rear wall 10 and the inwardly facing side of the second side wall 14 such that the outwardly facing side of the floor 22 is flush with the lower edge 36 of the front wall 8, flush with the lower edge 38 of the rear wall 10 and flush with the lower edge 98 of the second side wall 14. The inwardly facing side of the floor 22 is attached to the lower edges of the pocket walls 26 in the right half 18 of the container 2.

The floor 24 portion of the upper surface 4 is approximately half the longitudinal dimension of the front wall 8 and rear wall 10 or two and one-half inches. The floor portion of the upper surface 4 is glued between the inwardly facing side of the front wall 8, the inwardly facing side of the rear wall 10 and the inwardly facing side of the first side wall 12 such that the outwardly facing side of the floor 24 is flush with the upper edge 32 of the front wall 8, flush with upper edge 34 of the rear wall 10 and flush with the upper edge 100 of the first side wall 12. The inwardly facing side of the floor 24 is attached to the upper edges of the pocket walls 26 in the left half 16 of the container 2.

An upper cover guide rail 102 is attached to the outwardly facing side of the floor 24 portion of the upper surface 4. The guide rail 102 extends longitudinally along the midsection of the floor 24 and parallel to the front wall 8 and the rear wall 10. Small V-shaped notches 106 are on the outwardly facing side of the rail 102 and positioned above each pocket wall 26 underneath the floor 24 in the left half 16 of the container 2.

A lower cover guide rail 104 is attached to the outwardly facing side of the floor 22 portion of the lower surface 6. The guide rail 104 extends longitudinally along the midsection of the floor 22 and parallel to the front wall 8 and the rear wall 10. Small V-shaped notches 106 are on the outwardly facing side of the guide rail 104 and positioned below each pocket wall 26 above the floor 22 in the right half 18 of the container 2.

An upper cover 108 has the same dimensions as the floor 24 portion of the upper surface 4 and is slid over the pocket walls 26 and under the retaining member 62 of the upper cover guide 58 of the front wall 8 and under the retaining member 90 of the upper cover guide 86 of the rear wall 10. The upper cover 108 includes a stop member 110 attached to the inwardly facing side of the upper cover 108 near the first edge 112. The upper cover 108 is slid over the pocket walls 26 until the stop member 110 fits into the first V-shaped notch 106 of the upper cover guide rail 102. A first cover seal 114 is secured to the upper portion of the first side wall 12 and extends above the upper edge 100 of the first side wall 12. A second cover seal 116 is secured to the upper portion of the second side wall 14 and extends above the upper edge 118 of the second side wall 14. The cover seals 114 and 116 confine the upper cover 108 movement between the first side wall 12 and the second side wall 14. A small handle 120 is attached to the outwardly facing surface of the upper cover 108 to enable the upper cover 108 to be slid over the pockets 26 and the upper floor 24 by utilizing one finger.

A lower cover 122 with the same dimension as the floor 22 portion of the lower surface 6 and is slid under the pocket walls 26 and over the retaining member 68 of the lower cover guide 64 of the front wall 8 and over the retaining member 96 of the lower cover guide 92 of the rear wall 10. The lower cover 122 includes a stop member 124 attached to the inwardly facing side of the lower cover 122 near the first edge 126. The lower cover 122 is slid over the pocket walls 26 until the stop member 124 fits into the first V-shaped notch 106 of the lower cover guide rail 104. A first cover seal 128 is secured to the lower portion of the first side wall 12 and extends below the lower edge 130 of the first side wall 12. A second cover seal 132 is secured to the lower portion of the second side wall 14 and extends below the lower edge 98 of the second side wall 14. The cover seals 128 and 132 confine the lower cover 122 movement between the first side wall 12 and the second side wall 14. A small handle 134 is attached to the outwardly facing surface of the lower cover 122 to enable the lower cover 122 to be slid over the pockets 26 and the lower floor 22 by utilizing one finger.

The container 2 operates by sliding the upper cover 108 toward the second side wall 14 until the cover 108 touches the second cover seal 116 thereby exposing all the pockets 20 in the left half 16 of the container 2. Coins are placed in the pocket 20 adjacent the first side wall 12. The amount of coins will equal the toll of the first toll booth encountered. The amount of coins required for the second toll booth are placed in the pocket 20 adjacent the first pocket. The pattern is repeated for the remaining pockets that represent the toll required for a respective toll booth. When all the pockets 20 in the left half of the container contain coins, the upper cover 108 is slid toward the first side wall 12 until the cover 108 touches the first cover seal 114. All coins in the left half 16 of the container 2 are now secured in their respective pockets 20. The container 2 is rotated so that the lower cover 122 is facing upwards. The lower cover 122 is slid toward the first side wall 12 until the cover 122 touches the first cover seal 128 thereby exposing all the pockets 20 in the right half 18 of the container 2. Coins are placed in the pocket 20 adjacent the second side wall 14. The amount of coins will equal the toll of the next toll booth encountered after the last respective toll booth considered for the pockets of the left half 16 of the container 2. The amount of coins required for the next toll booth are placed in the pocket 20 adjacent the first pocket. The pattern is repeated for the remaining pockets that represent the toll required for a respective toll booth. When all the required pockets 20 in the right half of the container contain coins, the lower 122 is slid toward the second side wall 14 until the cover 122 touches the second cover seal 132. All coins in the right half 18 of the container 2 are now secured in their respective pockets 20.

When the first toll booth is encountered, the upper cover 108 is slid toward the second side wall 14 until the stop member 110 fits in the first notch 106 of the upper cover guide rail 102. The stop member 110 restricts continued movement of the upper cover 108 and makes a distinctive "click" sound when the stop member 110 hits the notch 106. This procedure exposes only the pocket 20 adjacent the first side wall 12. The coins can be quickly and easily removed and deposited at the first toll booth knowing that the amount of coins in the pocket is the exact amount required. The procedure is repeated for all subsequent toll booths encountered until the left half 16 pockets 20 have been emptied.

The container 2 is then rotated such that the lower cover 122 is facing upwards. The lower cover 122 is slid toward the first side wall 1 until the stop member 124 fits in the first notch 106 of the lower cover guide rail 104. The stop member 124 restricts continued movement of the lower cover 122 and makes a distinctive "click" sound when the stop member 124 hits the notch 106. This procedure exposes only the pocket 20 adjacent the second side wall 14. The coins can be quickly and easily removed and deposited at the toll booth knowing that the amount of coins in the pocket is the exact amount required. The procedure is repeated for all subsequent toll booths encountered until the right half 18 pockets 20 have been emptied.

The notches 106 are spaced apart a distance corresponding to the longitudinal dimension of each pocket, whereby when the covers slide to move their stop members 110 and 124 from one notch to seat in the next following notch in the pocket opening direction the next adjacent pocket is fully opened. When moved in the opposite or closing direction for the stop members 110 and 124 to move from being seated in one notch to seat in the next following notch in that opposite or closing direction the next adjacent pocket in such direction becomes fully closed but without the forward edge of the cover extending beyond such next adjacent pocket.

I claim:

1. A coin dispenser comprising an elongated container having a peripheral side wall surrounding an elongated cavity, said peripheral side wall extending from a first end to a second end, said peripheral side wall extending between an upper peripheral edge and a lower peripheral edge, said elongated container having an upper wall adjacent said upper peripheral edge, a spaced apart lower wall adjacent said lower edge, spaced apart partition means in said elongated cavity spaced apart in the direction from said first end of said elongated container to said second end thereof to provide a plurality of coin receiving and dispensing pockets in said elongated cavity, first cover means to selectively open and close respective ones of said coin receiving and dispensing pockets, and indicator stop means to indicate when each of said coin receiving and dispensing pockets has been opened, wherein said first cover means is positioned to selectively open and close said upper wall of said container to receive coins in said pockets through said upper wall when said first cover means is opened, to hold coins in said pockets when said first cover means is closed, and to dispense coins from respective ones of said pockets through said upper wall when said first cover means is selectively opened to open said respective ones of said pockets, said upper wall includes an elongated openable section extending from said first end of said peripheral wall toward said second end thereof and terminating at an intermediate point therebetween, an elongated closed upper wall section extending from said second end of said peripheral wall toward said first end thereof and terminating at said intermediate point therebetween, said first cover means being positioned to selectively open and close said elongated openable section of said upper wall of said container to receive coins in respective ones of said pockets through said elongated openable section of said upper wall when said first cover means is opened, to hold coins in said pockets when said first cover means is closed, and to dispense coins from respective ones of said pockets through said elongated openable section of said upper wall when said first cover means is selectively opened to open said respective ones of said pockets, said first cover means includes a first slidable cover member slidable on said elongated container between a fully closed position wherein it fully closes said elongated openable section of said upper wall and a fully open position wherein it fully opens said elongated openable section of said upper wall, said first slidable cover member being slidable over said elongated closed upper wall section as it is slidably moved from its fully closed position toward its fully open position, said first slidable cover member having an inwardly facing surface, said elongated closed upper wall section having an outwardly facing surface in facing relationship with said inwardly facing surface of said first slidable cover member as it is slidably moved toward its fully open position, said indicator stop means including a plurality of spaced apart first detent members of a first two part detent assembly positioned between said inwardly facing surface of said first slidable/cover member and said outwardly facing surface of said elongated closed upper wall section and spaced apart in the direction from said first end of said elongated container toward said second end thereof as well as spaced apart a distance corresponding to the spaced apart distance of said partition means, and a second detent member of said first two part detent assembly positioned to cooperatively couple with respective ones of said spaced apart first detent members thereof as said first slidable cover member is slidably moved from said fully closed toward said fully open position, one of said first and second detent members of said first detent assembly being affixed to said inwardly facing surface of said first slidable cover member and the other to said outwardly facing surface of said elongated closed upper wall section whereby said first slidable cover member selectively opens a respective one of said pockets to said openable section of said upper wall when slidably moved in the opening direction a distance sufficient to move said detent members of said first detent assembly from one cooperatively coupled position to the next adjacent cooperative coupling position.

2. A coin dispenser comprising an elongated container having a peripheral side wall surrounding an elongated cavity, said peripheral side wall extending from a first end to a second end, said peripheral side wall extending between an upper peripheral edge and a lower peripheral edge, said elongated container having an upper wall adjacent said upper peripheral edge, a spaced apart lower wall adjacent said lower edge, spaced apart partition means in said elongated cavity spaced apart in the direction from said first end of said elongated container to said second end thereof to provide a plurality of coin receiving and dispensing pockets in said elongated cavity, first cover means to selectively open and close respective ones of said coin receiving and dispensing pockets, and indicator stop means to indicate when each of said coin receiving and dispensing pockets has been opened, wherein said first cover means is positioned to selectively open and close said upper wall of said container to receive coins in said pockets through said upper wall when said first cover means is opened, to hold coins in said pockets when said first cover means is closed, and to dispense coins from respective ones of said pockets through said upper wall when said first cover means is selectively opened to open said respective ones of said pockets, second cover means to selectively open and close respective ones of said coin receiving and dispensing pockets, said second cover means being positioned to selectively open and close said lower wall of said container to receive coins in said pockets through said lower wall when said second cover means is opened, to hold coins in said pockets when said second cover means is closed, and to dispense coins from respective ones of said pockets through said lower wall when said second cover means is selectively opened to open said respective ones of said pockets, said upper wall includes an elongated openable section extending from said first end of said peripheral wall toward said second end thereof and terminating at an intermediate point therebetween, an elongated closed upper wall section extending from said second end of said peripheral wall toward said first end thereof and terminating at said intermediate point therebetween, said first cover means being positioned to selectively open and close said elongated openable section of said upper wall of said container to receive coins in respective ones of said pockets through said elongated openable section of said upper wall when said first cover means is opened, to hold coins in said pockets when said first cover means is closed, and to dispense coins from respective ones of said pockets through said elongated openable section of said upper wall when said first cover means is selectively opened to open said respective ones of said pockets, said lower wall includes an elongated openable section extending from said second end of said peripheral wall toward said first end thereof and terminating at said intermediate point therebetween, an elongated closed lower wall section extending from said first end of said peripheral wall toward said second end thereof and terminating at said intermediate point therebetween, said second cover means being positioned to selectively open and close said elongated openable section of said lower wall of said container to receive coins in respective ones of said pockets through said elongated openable section of said lower wall when said second cover means is opened, to hold coins in said pockets when said second cover means is closed, and to dispense coins from respective ones of said pockets through said elongated openable section of said lower wall when said second cover means is selectively opened to open said respective ones of said pockets, said first cover means includes a first slidable cover member slidable on said elongated container between a fully closed position wherein it fully closes said elongated openable section of said upper wall and a fully open position wherein it fully opens said elongated openable section of said upper wall, said first slidable cover member being slidable over said elongated closed upper wall section as it is slidably moved from its fully closed position toward its fully open position, said first slidable cover member having an inwardly facing surface, said elongated closed upper wall section having an outwardly facing surface in facing relationship with said inwardly facing surface of said first slidable cover member as it is slidably moved toward its fully open position, said indicator stop means including a plurality of spaced apart first detent members of a first two part detent assembly positioned between said inwardly facing surface of said first slidable cover member and said outwardly facing surface of said elongated closed upper wall section and spaced apart in the direction from said first end of said elongated container toward said second end thereof as well as spaced apart a distance corresponding to the spaced apart distance of said partition means, and a second detent member of said first two part detent assembly positioned to cooperatively couple with respective ones of said spaced apart first detent members thereof as said first slidable cover member is slidably moved from said fully closed toward said fully open position, one of said first and second detent members of said first detent assembly being affixed to said inwardly facing surface of said first slidable cover member and the other to said outwardly facing surface of said elongated closed upper wall section whereby said first slidable cover member selectively opens a respective one of said pockets to said openable section of said upper wall when slidably moved in the opening direction a distance sufficient to move said detent members of said first detent assembly from one cooperatively coupled position to the next adjacent cooperative coupling position.

3. A coin dispenser as set forth in claim 2, wherein said first two part detent assembly includes an elongated strip of material affixed to said outwardly facing surface of said elongated closed upper wall section extending from said second end of said container toward said first end thereof and terminating at said midregion point therebetween, said spaced apart first detent member of said first two part detent assembly comprise a plurality of spaced apart notches in said elongated strip of material, said second detent member of said first two part detent assembly comprises a projecting member projecting from said inwardly facing surface of said first slidable cover member positioned to seat in respective ones of said notches as said first slidable cover member is moved from its said closed position toward its said open position.

4. A coin dispenser as set forth in claim 2, wherein said second cover means includes a second slidable cover member slidable on said elongated container between a fully closed position wherein it fully closes said elongated openable section of said lower wall and a fully open position wherein it fully opens said elongated openable section of said lower wall, said second slidable cover member being slidable over said elongated closed lower wall section as it is slidably moved from its fully closed position toward its fully open position, said second slidable cover member having an inwardly facing surface, said elongated closed lower wall section having an outwardly facing surface in facing relationship with said inwardly facing surface of said second slidable cover member as it is slidably moved toward its fully open position, said indicator stop means including a plurality of spaced apart first detent members of a second two part detent assembly positioned between said inwardly facing surface of said second slidable cover member and said outwardly facing surface of said elongated closed lower wall section and spaced apart in the direction from said second end of said container toward said first end thereof as well as spaced apart a distance corresponding to the spaced apart distance of said partition means, and a second detent member of said second two part detent assembly positioned to cooperatively couple with respective ones of said spaced apart first detent members thereof as said second slidable cover member is slidably moved from said fully closed toward said fully open position, one of said first and second detent members of said second detent assembly being affixed to said inwardly facing surface of said second slidable cover member and the other to said outwardly facing surface of said elongated closed lower wall section whereby said second slidable cover member selectively opens a respective one of said pockets to said openable section of said lower wall when slidably moved in the opening direction a distance sufficient to move said detent members of said second detent assembly from one cooperatively coupled position to the next adjacent cooperative coupling position.

5. A coin dispenser as set forth in claim 4, wherein said second two part detent assembly includes an elongated strip of material affixed to said outwardly facing surface of said elongated closed lower wall section extending from said first end of said container toward said second end thereof and terminating at said midregion point therebetween, said spaced apart first detent member of said second two part detent assembly comprise a plurality of spaced apart notches in said elongated strip of material, said second detent member of said second two part detent assembly comprises a projecting member projecting from said inwardly facing surface of said second slidable cover member positioned to seat in respective ones of said notches as said second slidable cover member is moved from its said closed position toward its said open position.

6. A coin dispenser as set forth in claim 5, wherein said first slidable cover member includes an outwardly facing surface, a first thumb grasp member on said outwardly facing surface of said first slidable cover member to enable sliding it between its said open and closed positions with a user's thumb, said second slidable cover member includes an outwardly facing surface, a second thumb grasp member on said outwardly facing surface of said second slidable cover member to enable sliding it between its said open and closed positions with a user's thumb.

* * * * *